United States Patent [19] [11] 4,238,361
Alafandi et al. [45] Dec. 9, 1980

[54] AMMONIATED SILICA-ALUMINA GEL AND CATALYST CONTAINING THE SAME AND PROCESSES FOR PRODUCING SAME

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 44,676

[22] Filed: Jun. 1, 1979

Related U.S. Application Data

[63] Continuation-in-part of Ser. No. 9,487, Feb. 5, 1979, and Ser. No. 3,879, Jan. 16, 1979, and Ser. No. 935,628, Aug. 21, 1978, and Ser. No. 874,754, Feb. 3, 1978, and Ser. No. 869,856, Jan. 16, 1978, Pat. No. 4,192,778, and Ser. No. 769,118, Feb. 16, 1977, Pat. No. 4,142,995, and Ser. No. 718,167, Sep. 9, 1976, Pat. No. 4,058,484, and Ser. No. 718,166, Aug. 27, 1976, Pat. No. 4,085,069, and Ser. No. 874,755, Feb. 3, 1974, Pat. No. 4,198,319.

[51] Int. Cl.$^3$ .................. B01J 27/24; B01J 27/02; B01J 29/06; C01B 33/26
[52] U.S. Cl. .................. 252/438; 252/440; 252/455 R; 252/455 Z; 423/118; 423/328; 423/329

[58] Field of Search .................. 252/438, 440, 455 R, 252/455 Z; 423/328, 329, 118

[56] References Cited

U.S. PATENT DOCUMENTS

| 3,346,512 | 10/1967 | Gladrow et al. | 252/455 Z |
|---|---|---|---|
| 3,423,332 | 1/1969 | Moher et al. | 208/120 |
| 3,437,604 | 4/1969 | Micholko | 252/455 Z |
| 3,536,604 | 10/1970 | Joffe | 252/455 Z |
| 3,551,509 | 12/1970 | Thomas et al. | 252/455 Z |
| 4,085,069 | 4/1978 | Alofandi et al. | 252/455 Z |
| 4,139,493 | 2/1979 | Mickelson | 252/455 R |
| 4,142,995 | 3/1979 | Alofandi et al. | 252/455 Z |

Primary Examiner—Delbert E. Gantz
Assistant Examiner—William G. Wright
Attorney, Agent, or Firm—Philip Subkow; Bernard Kriegel

[57] ABSTRACT

This invention relates to hydrothermal treatment of silica-alumina cogels resulting in a reduction in the NH$_4$ content of the gel and the generation of a gamma crystal phase and the employment of such gels as cracking catalysts.

6 Claims, No Drawings

AMMONIATED SILICA-ALUMINA GEL AND CATALYST CONTAINING THE SAME AND PROCESSES FOR PRODUCING SAME

BACKGROUND OF THE INVENTION

This application is a continuation-in-part of applications, Ser. No. 935,628; filed Aug. 21, 1978; and Ser. No. 769,118, filed Feb. 16, 1977, now U.S. Pat. No. 4,142,999, and Ser. No. 874,755; filed Feb. 3, 1974, now U.S. Pat. No. 4,198,319; and application Ser. No. 3,879; filed Jan. 16, 1979, and Ser. No. 9, 487; filed Feb. 5, 1979, and Ser. No. 718,167; filed Sept. 9, 1976, now U.S. Pat. No. 4,058,484; and Ser. No. 718,166; filed Aug. 27, 1976, now U.S. Pat. No. 4,085,069; and Ser. No. 869,856; filed Jan. 16, 1978, now U.S. Pat. No. 4,192,778; and Ser. No. 874,754; filed Feb. 3, 1978.

Prior to the introduction of the exchanged crystalline zeolites of the faujasite type, as a catalyst for cracking of hydrocarbons, a commonly used catalyst was composed of a silica-alumina cogel containing from about 3 to about 25 percent by weight of $Al_2O_3$ on a volatile free basis.

Because of the substantially higher activity of the catalyst formed from crystalline zeolite, they have replaced to a large measure the silica-aluminum cogels as the primary component of a hydrocarbon conversion catalyst.

The literature relating to a silica-alumina gels and their catalytic properties is extensive (see Iler, "The Colloid Chemistry of Silica and Silicates", Chapter VI, Cornell Press [1955] Ed.) and citations there given. Milliken, et al., "Discussions Faraday Society" No. 8, "Heterogeneous Catalysis" p. 279, etc. (1950) Mills, et al., Journal of the American Chemical Society, vol. 72, pp. 1554–1556 (1950). See also: Erickson, U.S. Pat. No. 2,872,410; Winyall, U.S. Pat. No. 2,886,512; Wilson, U.S. Pat. No. 3,124,541; Magee, et al., U.S. Pat. No. 3,433,748; Haden, U.S. Pat. No. 3,065,054; Maher, et al, U.S. Pat. No. 3,423,332; Lussier, et al, U.S. Pat. No. 3,974,099.

STATEMENT OF THE INVENTION

We have discovered that the catalytic cracking activity of the silica-alumina cogels which are substantially free of sodium or other alkali metal cations may be materially improved by digesting the cogel at an elevated temperature in the presence of solutions containing hydrogen, ammonium or polyvalent cations such as rare earth or alkaline earth cations.

Gels so treated may, depending on the gel and the reaction system and the conditions of treatment, remain in the amorphous state or develop a crystalline phase.

Gels which have ammonium cations associated with the gel are herein referred to as ammoniated gels. Such gels for example may contain substantial concentrations of ammonium cations.

Gels may also be formed substantially free of ammonium cations by reacting sodium aluminate with an aluminum salt and maintaining the mixture on the acid side. The sodium content of the acid gel may be similar to that of the ammoniated gel. We refer to such gels as acid gels.

While the hydrothermal treatment of the acid gel according to the process of our invention produces a gel of substantial catalytic activity superior activity is obtained by treatment of the ammoniated gel.

In the case of the ammoniated gels the improvement in catalytic activity obtained by the hydrothermal treatment is increased by treatment at a temperature in excess of about 150° F. In such ammoniated gels, preferably those containing $SiO_2/Al_2O_3$ molar ratio of less than about 3, substantially free of sodium cations, the catalytic activity of the gel is increased to a degree which is dependent on the concentration of the ammonium cations associated with the treated gel. Preferably the $NH_4$ content of the gel, expressed as $NH_3$, is in the range from less than about 0.3 and preferably less than 0.2 equivalents of ammonium per mole of $Al_2O_3$.

The activity produced from such gels depends on the conditions of the hydrothermal treatment and the ionic system. A crystalline phase may develop or the gel may remain amorphous and a reduction in the ammonium content of the gel and an increase in the catalytic activity of the gel may be obtained in both cases.

The activity may be measured by the microactivity cracking test described in the Oil and Gas Journal of Sept. 16, 1966; page 48, etc.; and November 22, 1975; page 60, etc.

In the following examples the conditions in carrying out the above tests is as follows. The calcined pelleted catalyst was first steamed at temperatures and for times specified below and then used in cracking of a petroleum fraction under the following conditions. The oil charge is a wide boiling range high sulfur feed stock (boiling range about 430° to 1000° F.). The catalyst to oil ratio is 4. The weight hourly space velocity is 16.45 grams of oil per gram of catalyst per hour. The temperature of the reactor is 910° F. The percent conversion is reported as the volume of liquid condensate product of boiling point range of up to 421° F. based on the volume of liquid charge. The percent conversion when the catalyst is tested after calcination of the catalyst in air for two hours at 1450° F. is termed M activity. When the calcined sample is steamed at 1500° F. for two hours, prior to testing it is termed the S activity. When the calcined sample is first steamed for two hours at 1550° F., prior to testing, it is termed S+ activity.

The process of our invention includes the treatment of a silica-alumina cogel containing less than about 1% of $Na_2O$ based on the cogel on a volatile free basis by a hydrolytic treatment of the gel. The treatment may be carried out in the presence of monovalent cations other than alkali metal cations such as hydrogen or ammonium or polyvalent cations such as rare earth cations or alkaline metal cations. We prefer to carry out the hydrothermal treatment under acid conditions rather than at higher pH as for example under alkaline conditions. A superior amplification in the activity by reductions in ammonium content in the gel is obtained by treatment under acid conditions.

Under relatively mild and controlled hydrothermal conditions of temperatures below about 250° F., the reaction of the gel having low $Na_2O$ content, results in an amorphous gel which exhibits superior catalytic activity as compared with the original gel. At temperatures above about 350° F. and at suitable concentrations of cations and time of digestion a crystalline phase develops.

The nature of the crystalline phase as evidenced by its x-ray spectrum depends on the nature of the cations employed in the hydrothermal treatment. The product of this application is produced by employing a solution of alkaline-earth cations preferably magnesium. A crystal phase is generated in the gel which acts as a host for the crystalline phase. For purposes of distinguishing the gel and the crystal phase from others which may be generated by variations in the hydrolytic treatment of the cogel, we have designated the crystal phase as "gamma" and the gel which contains the "gamma" phase as "gamma" cogel.

The crystalline is characterized by an x-ray spectrum in which characteristic peaks occur. Excessive exposure of the gel for prolonged periods of time particularly at the higher temperatures may deleteriously affect the catalytic activity of the deammoniated gel although a successful reduction in ammonium content is achieved.

For purposes of describing the result of the process of treating the ammoniated gel with water or a solution of a salt, whereby the $NH_4$ content of the gel is reduced, we refer to the process as an "exchange" and the cation as "associated" with the gel.

The cogel, which we prefer to treat by the process of our invention to form the catalyst of our invention may be produced by any of the methods used in the prior art to form such cogels in which the treatment results in a gel having an ammonium ion associated with gel as in the ammoniated gel referred to above.

The cogel, which may be hydrothermally treated according to our invention, may be formed by treating a mixture of silica hydrosol with aluminum salt in the ratios to produce a gel of the desired $SiO_2/Al_2O_3$ ratio and exchanged with ammonium cation to reduce the sodium content of the gel.

We prefer to coprecipitate the silica-alumina hydrosol to form the gel from a mixture of sodium silicate and aluminum salt, e.g. aluminum sulfate, or aluminum nitrate or aluminum chloride made alkaline with ammonium hydroxide to reduce the sodium content as is more fully described below.

We have found that the improvement in the catalytic activity of a gel treated according to our invention depends on the silica to alumina ratio of the cogel. The ammonia content of the ammoniated gel of our invention depends on the silica to alumina ratio of the gel. The catalytic activity attainable by our invention is substantially greater as the molar weight ratio of $SiO_2$ to $Al_2O_3$ is less than about 3 and preferably about 1 to about 2.

Our preferred embodiment of our invention is to employ an ammoniated silica-alumina cogel having an $SiO_2/Al_2O_3$ molar ratio in the range of about 1.25 to about 2.5, and an ammonium ion content of less than about 0.3 equivalents of ammonium cation per mole of $Al_2O_3$ to form a catalyst having a M activity in excess of 60%.

The preferred embodiment of the process for producing the preferred embodiment of the "gamma" cogel is to hydrothermally treat an ammoniated cogel with an acid solution of magnesium salt solution at an elevated temperature to reduce the ammonia content of the gel as stated above.

We prefer to employ the gel formed when using the ammoniated cogel formed from aluminum sulfate, when the gel is to contain a crystalline phase.

EXAMPLE 1

5,017 grams of sodium silicate (28% $SiO_2$-8.9% $Na_2O$ by weight) equivalent to 1,440 grams of $SiO_2$ is dissolved in water. The solution is acidified to a pH of 11 with sulfuric acid; 26,896 grams of an aluminum sulfate solution (equivalent to 1,560 grams of $Al_2O_3$) is added gradually to the acidified slurry with constant agitation. The pH at the end of the addition of the aluminum sulfate should be in the range of about 3 to about 3.5. The solution is passed through a colloid mill to be well homogenized. The homogenized solution is made alkaline with ammonium hydroxide with constant and vigorous agitation to adjust the mixture to a pH of about 8.5 to about 9.

The mixture is vigorously stirred and the pH is maintained in the range of about 8.5 to about 9 by suitable adjustment for about 1 hour to insure uniformity of the mixture. It is then heated to a temperature of about 75° to 80° C. for about 30 minutes and then immediately filtered and the filter cake washed with hot distilled water of about 80° C. The wash filter cake is then slurried to a solid content of about 5% in distilled water which contained about 2% of ammonium nitrate and then filtered. The filter cake is then again slurried with ammonium nitrate solution as in the last previous step. The filter cake from the last step is again reslurried in an ammonium nitrate solution as above and filtered. The filter cake from the last filtration above is washed with distilled water.

The ammoniated cogel is amorphous to K alpha copper radiation at 500 counts per second on the counter of the strip chart x-ray spectrum so produced. The gel produced as above, was employed in the following examples, except in Example 19 where the acid gel was used. In all examples and except as is indicated in Example 7, where zerogel was employed, all of the examples employed the hydrogel.

The above cogel was pelleted and tested by the microactivity test identified above after steaming at 1450° F. for two hours (M activity) and again another sample after steaming at 1500° F. for two hours (S activity) and a third sample after steaming for two hours at 1550° F. (S+ activity). The results are reported as volume percent conversion.

The results obtained were as follows:

|  | M | S | S+ |
|---|---|---|---|
| Volume % conversion: | 43 | 36.5 | 46 |

The gel was also mixed with acid treated halloysite (see Secor, U.S. Pat. Nos. 2,935,463 and 3,446,727) in the ratio of 90% by weight of the dried gel and 10% by weight of the dry halloysite. The mixture was tested as above with teh following results:

|  | M | S+ |
|---|---|---|
| Volume % conversion: | 47 | 44 |

EXAMPLE 2

The gel as in Example 1 was exchanged with magnesium nitrate as a pH of 4 under autogenous pressure at a temperature of 400° F. for two hours, cooled, filtered and washed. The filter cake was analyzed and had the following composition on a volatile free basis:

| $Al_2O_3$ = | 50.4% | by weight |
|---|---|---|
| $SiO_2$ = | 46.9% | by weight |
| $Na_2O$ = | 0.09% | by weight |
| $NH_3$ = | .88% | by weight |
| MgO = | .56% | by weight |

-continued

| | | |
|---|---|---|
| $NO_3 =$ | .64% | by weight |

The x-ray pattern produced as in Example 1 showed the d spacings of Table 1.

TABLE 1

| d (angstroms) | I |
|---|---|
| 7.22 | 7 |
| 4.43 | 5 |
| 4.28 | 2 |
| 3.61 | 3 |
| 3.56 | 3 |
| 3.35 | 14 |
| 2.56 | 2 |
| 2.35 | 5 |

We have designated this crystal phase as "gamma" and the host gel as "gamma" gel.

90% of the gel was mixed with 10% acid treated halloysite and tested as in Example 1 with the following results:

| | |
|---|---|
| M = | 56% |
| S+ = | 45% |

The preferred embodiment of our invention is as stated in Example 2.

Modifications of the temperature, ratios of reactants, pH, time and time of digestion may be adjusted to produce the "gamma" gel. Departures from the conditions as set forth in said examples may be made and the deammoniated gel x-rayed as described above. Such variations following the above guides will permit those skilled in the art to produce the "gamma" gel of this invention.

It will be understood by those skilled in this art, that the exact values of the "d" spacings of the "gamma" crystal phase may vary, for example, plus or minus about 1 or 2% from those of Table due to experimental artifacts and uncertainties in the production of x-ray spectra.

The treated gel may be employed with or without a matrix, i.e. alone if desired as for example, as a microsphere obtained by spray drying the slurry of the exchanged product by dispersing the washed filter cake in water and spray drying.

Instead of using the exchanged gel either alone or mixed with a relatively catalytically inactive constituent acting as a matrix such as clay, silica gel or alumina gel or other inorganic oxide such as gel or cogel, the exchanged gels produced according to our invention may be combined with an exchanged zeolite. Such as the ammonium or the rare earth or rare earth and ammonium exchanged zeolites or alkaline with exchanged zeolite either of the faujasite type such as the X or Y zeolite or other crystalline alumino-silicate zeolites such as mordenite, chabazite, erionite, and zeolite A.

The mixture may be in the ratio in the range of about 1% to less than about 50% by weight of the zeolite suitably exchanged, if necessary, to a sodium content as in the case of catalysts of the prior art and the above exchanged silica-alumina gel. In the case of an ammonium or a rare earth exchanged Y or exchanged with both $NH_4$ and ReO, with a $Na_2O$ ratio of less than 5% by weight on a volatile free basis, we may use a minor proportion of about 1 to less then 50% of zeolite based on the mixture of gel and zeolite. A suitable mixture is about 20% by weight of the zeolite to 80% by weight of the cogel all on a volatile free basis. Such mixtures may suitably be combined with matrix material for zeolites in the prior art.

When using the exchanged "gamma" gel with a zeolite, we prefer to use the exchanged gel to be mixed with the rare earth exchanged zeolites of the prior art with an $Na_2O$ content of less than about 4-5%, for example 3.5% and preferably the so-called A type (see Patent 4,100,108). We prefer to employ the Y zeolite of an $SiO_2/Al_2O_3$ ratio of above 4 for example, 4.5. The percent of the zeolites and the gel on a volatile free basis may be about 5% to 25% of the mixture, the exchanged gel.

Instead of mixing the exchanged gel with the exchanged zeolite as above, we may combine the zeolite either in the sodium form or exchanged as above with the gel such as the gel of Example 1. (See our applications Ser. Nos. 769,118, now U.S. Pat. No. 4,142,995 filed Feb. 6, 1977; and 874,755, now U.S. Pat. No. 4,198,319 filed Feb. 3, 1978.) The zeolite may be partially exchanged for example with $NH_4$ or rare earth or with both for example to reduce the $Na_2O$ to about 3 to about 6% of the exchanged gel on a volatile free basis. The spray dried zeolite and gel may then be exchanged, preferably with an acid solution of rare earth salts as is described in the above examples.

Our invention includes the use of the hydrothermally treated gel of our invention either alone or combined with a matrix as above, and whether or not combined with a zeolite as described above, in catalytic process other than stright catalytic cracking as described above. Such processes include other hydrocarbon conversion process such as, fore example, hydrocracking, hydroforming and hydrodesulfurizing process. Promoters employed in the prior art in catalysts for such process may be employed with the hydrothermally treated gels of our invention.

We claim:

1. A crystalline composition of matter consisting essentially of gamma crystalline complex characterized by a d spacing corresponding substantially to Table 1.

2. A composition of matter comprising in combination a host silica-alumina cogel in combination with gamma crystal phase characterized by d spacings corresponding substantially to those of Table 1.

3. A composition of matter comprising in combination an amorphous ammoniated silica-alumina gel containing $NH_4$ ions associated with the gel in an amount substantially less than about 0.3 equivalents per mole of alumina ($Al_2O_3$), and having a $SiO_2/Al_2O_3$ molar ratio in the range of about 1 to less than 3 and magensium ions and gamma crystalline phase characterized by d spacings corresponding substantially to those of Table 1.

4. A cracking catalyst comprising the composition of claims 1, 2, or 3, and a matrix.

5. A cracking catalyst comprising the composition of claims 1, 2, or 3, and a crystalline alumino silicate zeolite.

6. A cracking catalyst comprising the composition of claims 1, 2, or 3, and a zeolite of the faujasite type.

* * * * *